United States Patent [19]
Jones

[11] 4,344,122
[45] Aug. 10, 1982

[54] CURRENT SOURCED INVERTER WITH SATURATING OUTPUT TRANSFORMER

[75] Inventor: Dwight V. Jones, Baldwinsville, N.Y.

[73] Assignee: General Electric Company, Schenectady, N.Y.

[21] Appl. No.: 184,212

[22] Filed: Sep. 5, 1980

[51] Int. Cl.$^3$ .......................................... H02P 13/22
[52] U.S. Cl. ...................................... 363/23; 363/25; 363/49; 363/53; 363/97; 331/113 A
[58] Field of Search ................ 331/113 A; 363/22–26, 363/49, 97, 16, 31, 53, 133, 134; 323/266

[56] References Cited

U.S. PATENT DOCUMENTS

| | | | |
|---|---|---|---|
| 2,849,614 | 8/1958 | Rover et al. | 363/133 |
| 3,742,330 | 6/1973 | Hodges et al. | 323/266 |
| 3,846,691 | 11/1974 | Higgins | 363/25 |
| 4,034,280 | 7/1977 | Cronin | 363/97 |
| 4,190,883 | 2/1980 | Cowett | 363/134 |
| 4,215,392 | 7/1980 | Rhoads | 363/49 |

OTHER PUBLICATIONS

IBM Technical Disclosure Bulletin, vol. 14, No. 11, Apr. 1972, p. 3548.
Conference: Application of Remote Sensing and Ranging Systems From Space, 20th Int. Space Convention, Rome, Italy, (Mar. 11–13, 1980), 153–64.

*Primary Examiner*—William H. Beha, Jr.
*Attorney, Agent, or Firm*—Alexander M. Gerasimow; James C. Davis, Jr.; Marvin Snyder

[57] ABSTRACT

A Royer circuit, which includes an inverter and a saturating output transformer, is powered from a current source rather than from a voltage source, thereby reducing transistor current overshoot when the output transformer saturates. A current source inductor and a PWM (pulse width modulated) power transistor are series connected in the current return line of the inverter. The PWM power transistor emitter is connected so that potential between it and the common DC input power terminal will be low. This permits the PWM power transistor to be direct-coupled from a low voltage PWM switched mode power supply control circuit. A start-up circuit for supplying start-up power to inverter control circuitry from the DC input source is provided. Feedback loop control for the PWM power transistor is also provided.

13 Claims, 4 Drawing Figures

CURRENT SOURCED INVERTER WITH SATURATING OUTPUT TRANSFORMER

BACKGROUND OF THE INVENTION

This invention relates to inverters powered from a current source. More specifically, the invention relates to a DC-to-DC converter in which the inverter and saturating output transformer of a Royer circuit are powered from a current source rather than from a voltage source.

DC-to-DC converters, commonly known as "switchers" or "switching converters", find wide use in applications requiring DC voltage outputs which are well-regulated and substantially ripple free. Well-designed converters are capable of providing such output voltages over a wide range of DC inputs and varying load requirements. In general, such converters operate by converting the DC input to AC, transforming the AC to a higher or lower voltage as desired, and rectifying the AC to provide the required DC output voltage. It is also common in such converters to regulate the output voltage by means of one or more feedback loops. Typically, in response to a feedback signal the duty cycle of a switch, usually a power transistor, is varied, thereby providing the necessary regulation. The term pulse width modulation (PWM) is frequently used to describe such control strategy. The circuit portion of the DC-to-DC converter which provides the AC input to the rectifier circuit is known as an inverter, although the term converter is also used. The AC output of the inverter can be regulated against variations in the DC input or load requirements and employed to supply power to AC loads.

Cronin et al. U.S. Pat. No. 4,034,280, issued July 5, 1977 (incorporated herein by reference) discloses what may now be referred to as a conventional current powered DC-to-DC converter, in comparison to which the advance of the present invention may best be appreciated. In the patented device, a current source, comprising an inductor, provides essentially constant current to a push-pull inverter coupled to the primary winding of a linear transformer. A square wave source drives the inverter and synchronizes the operation of a digital control signal processor (DCSP). The primary function of the DCSP unit is to pulse width modulate, in response to a feedback signal, a transistor switch disposed in the inverter's positive input line and in series with the inductor.

Several drawbacks are associated with the above-described converter. The inverter utilized in the described device is known as a driven linear inverter. The inverter is termed linear because its output transformer is operated below the saturation point. Inverters of this type require a separate source of inverter drive such as, for example, a square wave generator. Linear operation of the inverter is acquired at the expense of increased output transformer size and added drive circuitry, and consequently at greater weight and cost. The connection of the PWM power transistor in series with the inductor in the positive (high) line of the DC input introduces additional complexity into the design. Such connection of the PWM power transistor requires that the low voltage drive output of the DCSP unit be isolated from the floating high positive voltage potential of the power transistor's base-emitter junction. Transformer isolation of the low voltage PWM drive is more difficult to achieve than isolation of the square wave inverter drive since additional demands are placed on the design of the transformer due to the non-symmetrical drive of the PWM power transistor (i.e., the duty cycle deviates from 50 percent). For example, if the drive is on for 90 percent and off for 10 percent, or vice versa, provisions must be made in the magnetic design to accommodate the volts x seconds unbalance to avoid saturation of the transformer. In contrast, in the square wave inverter the duty cycle does not depart from 50 percent so that the flux is symmetrical in both directions, allowing a simplified transformer design.

The present invention results in circuit simplification compared to the type of converter described above and additionally avoids the transistor current overshoot inherent in a Royer circuit operated from a constant voltage source.

In accordance with the invention, significant reduction in circuit complexity is realized by isolating the square wave inverter of the Royer circuit, rather than the low voltage PWM drive for the PWM power transistor as described above. To this end, the emitter of the PWM power transistor, in the inverter return line, is connected so there is a low voltage potential between it and the common DC supply return. The pulse width modulation signal for the PWM power transistor switch is referenced with respect to the common supply return. This allows the PWM power transistor to be direct-coupled from the low voltage PWM signal regulator. Isolation of the inverter in the manner described also simplifies the magnetic design since, as discussed above, the necessity to account for non-symmetrical drive is eliminated. It should be additionally noted that isolation of the inverter and the connection of the emitter of the PWM power transistor so that a low voltage potential exists between it and the common terminal of the DC supply, similarly permits simplification of the magnetic design of a driven inverter.

Other significant improvements and circuit simplifications are derived from employing a Royer circuit powered from a current source. Since the Royer circuit utilizes a saturating transformer, the inverter, once started, requires no separate source of drive for commutating the inverter transistors. The energy stored in the transformer magnetic field, along with properly phased drive windings, is used to provide the bias for the inverter transistors. Furthermore, powering the Royer circuit from a current source limits the current that can flow at the shut-off of one inverter transistor and the start-up of another. As a result, the current overshoot of 100 percent to 500 percent present in the constant voltage sourced Royer circuit is reduced to less than 10 percent with the current sourced Royer circuit.

These and other improvements provided by the present invention will be more fully described in the detailed description of the invention.

SUMMARY OF THE INVENTION

The power converter of the present invention includes a Royer circuit in which the inverter and saturable core output transformer are powered by a constant current source rather than a constant voltage source. The current source limits the current flow during transformer core saturation, and therey significantly reduces transistor overshoot current. The average voltage impressed on the inverter is controlled by a power transistor switch, the conductive periods of which are controlled by a feedback loop which includes a reference voltage, an opto-isolator and a PWM regulator. By thus controlling the average voltage to the inverter, the output voltage is maintained relatively constant in spite of variations in DC input voltage and load requirements. The PWM power transistor and the current source are coupled in series in the current return line of the inverter. The emitter of the PWM transistor is connected to maintain a low voltage potential between it and the common line of the input voltage, allowing the transistor to be direct-coupled from the low voltage PWM signal regulator. Such isolation of the inverter simplifies the magnetic design in both the Royer circuit and the driven inverter. A start-up circuit is provided to supply power from a DC input source to the control circuitry. When the inverter begins oscillating, power is supplied from the inverter output and the start-up circuit is biased into nonconduction.

Although the inverter of the present invention may be advantageously employed to power AC loads, in the preferred embodiment the inverter is employed in a DC-to-DC power converter which converts an unregulated DC input voltage to a regulated DC output voltage which remains constant despite variations in input voltage or load requirements.

Accordingly, it is an object of the present invention to provide a current sourced inverter having a saturating output transformer.

Another object of the invention is to provide a DC-to-DC converter including a current sourced Royer circuit.

Another object of the invention is to provide a current sourced inverter which permits direct coupling of a low voltage PWM drive to a PWM power transistor so as to simplify the magnetic design of the current sourced Royer circuit and the driven inverter.

DETAILED DESCRIPTION OF THE INVENTION

Figure 1:
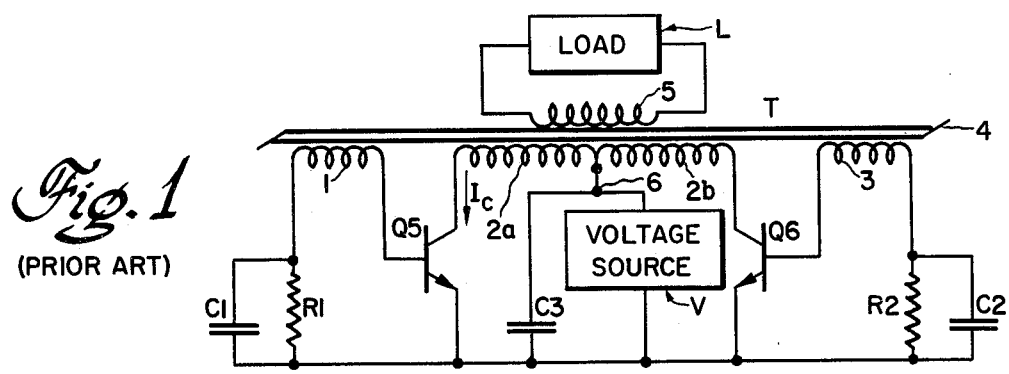
FIG. 1 is a schematic diagram of a conventional Royer circuit powered from a voltage source.

FIG. 1 illustrates a conventional voltage powered Royer circuit. The circuit includes transformer T with saturable core 4 having primary winding 2, secondary winding 5 having a load L connected thereacross, and transistor base drive windings 1 and 3 wound thereon. Primary winding 2 is provided with a center tap 6 which divides primary winding 2 into two electrically identical halves 2a and 2b and which is connected to one side of a constant voltage source V. Transistors Q5 and Q6 having their respective collectors connected to the ends of winding halves 2a and 2b, respectively, and having their emitters connected in common to the other side of voltage source V, comprise the inverter and alternate in applying a voltage from constant voltage source V across primary winding halves 2a and 2b, respectively. Parallel resistance and speed-up capacitance combinations R1, C1 and R2, C2, respectively, connected in series with base drive windings 1 and 3, respectively, and the emitter of each of transistors Q5 and Q6, respectively, provide additional drive during transistor turn-on to insure reliable and rapid saturation (conduction) of inverter transistors Q5 and Q6. Capacitor C3 connected across voltage source V provides filtering and additionally bypasses inductance associated with the leads of the voltage source V. Increasing the value of capacitance C3 permits voltage source V to more closely model an ideal voltage source.

In operation, when voltage source V supplies output to the inverter, a small current flows in one of transistors Q5 or Q6 due to one having a greater gain than the other. It will be assumed that such a current flows in transistor Q5, so that voltage source V is impressed across primary winding 2a and causes the same current to flow therein. The current in winding 2a causes flux density within core 4 to increase so that base drive winding 1 develops a voltage. The size of capacitor C1 is selected such that, in conjunction with the inductance of winding 1, the voltage on winding 1 builds up rapidly. The resulting rapid buildup of transistor Q5 base-to-emitter voltage causes the transistor to saturate rapidly. Overdriving the base of transistor Q5 in this manner causes a large collector current to flow through the transistor at the earliest instant.

Rather rapidly, the full amplitude of voltage source V (less saturation drop across transistor Q5) is applied across the primary winding 2a. In time, the flux within core 4 reaches its maximum saturated value and the transformer is said to be saturated. During saturation there is no change in flux in base drive winding 1, so that drive voltage at the base of transistor Q5 falls to zero and the transistor is shut off. The magnetic field associated with the transformer core collapses and in doing so reverses the voltage on base drive winding 3, which in combination with speed-up capacitor C2 now drives transistor Q6 into saturation. The inverter has thus begun oscillating and will continue to do so at a frequency dependent on the size of transformer core 4, the number of turns in primary winding 2, and the voltage V across windings 2a or 2b. That is, for a core of given type and size, having a given number of winding turns thereon, the commutation time from one inverter transistor to another (essentially the time it takes to saturate the core) is dependent on the magnitude of the applied voltage and the time that the voltage is impressed across the winding turns (volts×seconds). Such inverters are also known as push-pull parallel inverters since each half of the primary winding 2a and 2b alternatively conducts current 50 percent of the time.

It is precisely at the time that the transformer core has reached saturation and the conducting inverter transistor is about to shut off, that undesirably large overshoot currents occur in a constant voltage sourced Royer circuit. The reason for the large overshoot currents is that at transformer saturation, transformer action ceases since there is no change in flux. The load L on transformer secondary 5 is no longer transformed to appear as a current-limiting impedance on the primary side of the transformer. In the absence of such transformed load impedance, overshoot current through transistor Q5 represented by the arrow alongside collector of transistor Q5 and depicted graphically in FIG. 2, is limited essentially only by the voltage source impedance and the impedance of the saturated transistor.

Figure 2:
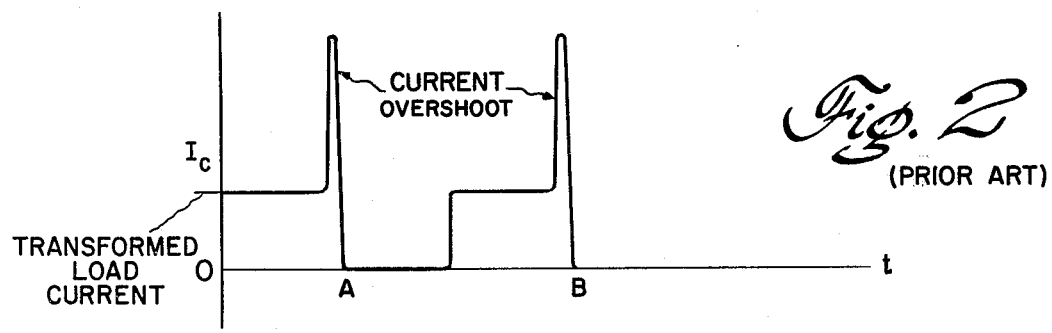
FIG. 2 is a graphical representation of transistor current in a conventional Royer circuit showing transistor current overshoot at transformer saturation.

Points A and B on the time axis t in FIG. 2 represent the transistor shut-off times for one of the transistors Q5 and Q6. In practice, the overshoot current varies between 100 percent and 500 percent of the transistor saturation current, depending on the transistor current gain. The overshoot current, constituting the spike above the transformed load current amplitude and occurring immediately prior to the shut-off of the inverter transistor, greatly increases the transistor's switching losses and decreases its safe area of operation during reverse bias turn-off, thus requiring the use of higher rated transistors.

Figure 3:
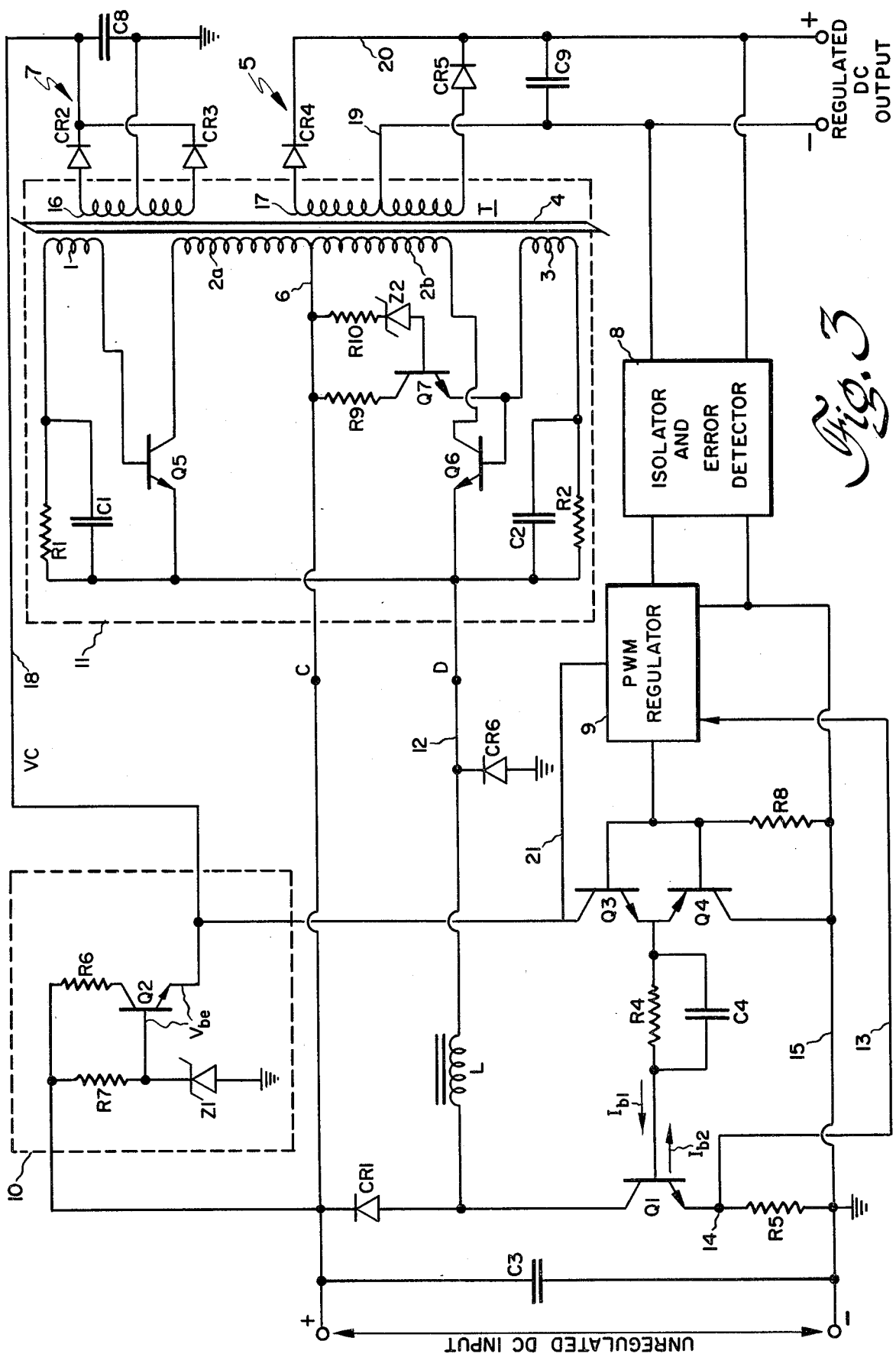
FIG. 3 is a schematic diagram of the DC-to-DC converter, including the current sourced Royer circuit of the present invention.

The inverter and DC-to-DC converter in accordance with the present invention is illustrated in FIG. 3 in which parts identical to those of FIG. 1 have been assigned like reference numbers. The constant voltage source V powering the Royer circuit shown in FIG. 1, has been replaced in the circuit of FIG. 3 by a constant current source comprising an inductor L, PWM power transistor Q1 and flywheel diode CR1. Inductor L is selected to be sufficiently large in order that it supply constant current to the inverter during conduction. The induction L and the PWM transistor Q1 are connected in series in the inverter current return line 12. Although it is not essential for powering inverter circuit 11 with a current source, the emitter of transistor Q1 is connected so that a low voltage exists between it and the common (negative) DC input power supply return 15. Replacement of the voltage source with a constant current source limits the overshoot current $I_c$, illustrated in FIG. 2 by the spikes above the transformed load current amplitude, to less than 10 percent of its previous maximum amplitude. The reduction in overshoot current from a maximum of 500 percent of the transistor saturation current to less than 10 percent thereof is due to the firm limitation on the current available from the current source. In a current sourced Royer circuit, the current $I_c$ is limited by the current source, rather than the voltage source impedance and the current gain of the inverter transistor as is the case in the voltage powered Royer circuit.

Diode CR1, connected between one side of inductor L and center tap 6, and diode CR6, connected between the other side of inductor L and ground, place fixed limits on the voltage excursions across inductor L. The voltage on the one side of inductor L cannot swing above the positive potential of the input DC source by more than the voltage drop across diode CR1, typically less than 1 volt. Similarly, the other side of inductor L cannot swing below ground by more than the voltage drop across diode CR6, also typically less than 1 volt. In so fixing the voltage excursions across inductor L, the voltage excursions across the input terminals C and D of inverter 11 are also fixed. Although inverter 11 is current-sourced on a pulse-by-pulse short time basis, the average voltage applied to the inverter is regulated and transformed to the load, giving the desired output voltage.

A starter circuit 10 is employed in the circuit of FIG. 3. This circuit is necessary because power for a complementary transistor pair Q3 and Q4 is supplied from an inverter output circuit 7. Since power is not available from circuit 7 until inverter 11 begins oscillating, starter circuit 10 provides the necessary power from the input DC source. The starter circuit comprises a transistor Q2 having its collector connected through a bias resistor R6 to the positive side of the input DC source and its base connected through a bias resistor R7 to the positive side of the input DC source. The base of transistor Q2 is also connected through a zener diode Z1 to ground.

The emitter of transistor Q2 is connected to the collector of NPN transistor Q3 which, in turn, has its emitter connected to the emitter of PNP transistor Q4, the collector of which is connected to the negative side of the input DC source. The emitter of transistor Q2 is also connected to inverter output circuit 7 which comprises a full-wave rectifier made up of diodes CR2 and CR3 connected to each end, respectively, of an output winding 16 on core 4 having a center tap connection to ground. A filter capacitor C8 is connected between the cathodes of diodes CR2 and CR3 at one side and ground at the other side.

The base of a transistor Q1 is coupled to the emitters of complementary transistors Q3 and Q4 through a resistor R4 shunted by a speed-up capacitor C4. The collector of transistor Q1 is connected to the anode of diode CR1 while the emitter of transistor Q1 is coupled to the negative side of the DC input power supply through a current-sense resistor R5 and to PWM regulator 9 through a voltage sensing conductor 13. PWM regulator 9 is connected to drive the base of each of transistors Q3 and Q4, and is also coupled to the negative side of the input DC source through resistor R8.

In operation, when the input DC voltage exceeds breakdown voltage Vz1 of zener diode Z1, transistor Q2 applies a voltage Vz1 minus the base-to-emitter voltage Vbe of transistor Q2 to the collector of transistor Q3 and PWM regulator circuit 9 which drives transistors Q3 and Q4. As transistor Q3 becomes saturated, resistor R4 and speed-up capacitor C4 insure the rapid turn on of PWM power transistor Q1.

Inverter 11 includes a zener diode Z2, an NPN transistor Q7 and resistors R9 and R10. The cathode of zener diode Z2 is coupled to the positive side of the input DC source through current-limiting resistor R10, and its anode is coupled to the base of transistor Q7. The collector of transistor Q7 is coupled to the positive side of the input DC source through a bias resistor R9, and its emitter is coupled to the base of inverter transistor Q6 to provide base drive thereto during inverter startup.

Since the breakdown voltage of zener diode Z2 is higher than that of diode Z1, its conduction is delayed. However, when the increasing DC input voltage reaches a sufficiently high value, diode Z2 breaks down and applies base bias to transistor Q7 which, in turn, drives the base of inverter transistor Q6. As current begins to flow through inverter transistor Q6, base drive from a circuit comprising resistor R2, speed-up capacitor C2, and base drive winding 3 rapidly saturates transistor Q6. Inverter oscillations proceed in the manner described above, and voltage Vc for powering transistors Q3 and Q4, as well as associated control circuitry including regulator 9 and isolator and error detector 8 becomes available on conductor 18 from inverter output circuit 7. The relation of zener breakdown voltage Vz1, base-to-emitter voltage $V_{be}$ of transistor Q2, and output voltage Vc is defined by the relationship Vz1<Vc+Vbe, so that when the inverter oscillates, transistor Q2 is biased into nonconduction. Similarly, the winding turns ratios of transformer T are designed so that the inverter input voltage is less than that required to maintain conduction through zener diode Z2, thereby biasing zener Z2 and transistor Q7 into nonconduction. It should also be noted that an under-voltage-sensing circuit (not shown) may be provided to shut off inverter operation when the DC input voltage falls below the minimum necessary to operate the load, thus protecting inverter transistors Q5, Q6, and power transistor Q1 from insufficient base drive current to keep them saturated.

Regulation of the average voltage applied to inverter 11 in response to variations in the regulated DC output voltage from inverter output circuit 5 is provided by a feedback loop which includes isolator and error detector circuit 8, PWM regulator 9, complementary driver transistors Q3 and Q4, and PWM power transistor Q1. Inverter output circuit 5 comprises a full-wave rectifier made up of diodes CR4 and CR5 connected to each end, respectively, of an output winding 17 on core 4 having a center tap 19. The regulated DC output voltage of inverter 11 appears across a filter capacitor C9 connected between center tap 19 and the cathodes of diodes CR4 and CR5. A conventional isolation and error detection circuit 8 is coupled at its input to the regulated DC output of inverter output circuit 5 and at its output to PWM regulator 9.

Although isolation between the inverter output DC voltage and inverter input DC voltage may be provided by employment of an isolation transformer, in the preferred embodiment of the invention an opto-isolator circuit is used. Such opto-isolator circuits comprise a light-emitting diode and phototransistor combination which may be fabricated in integrated circuit form. One suitable device may be an integrated circuit identified by the standard industry designation 4N37. A zener diode may be employed in circuit 8 as a convenient source of reference potential for detecting variations in the regulated DC output voltage of inverter output circuit 5.

Isolator and error detector circuit 8 detects deviations of the regulated DC output voltage of inverter output circuit 5 (due to fluctuations in DC input voltage by varying load requirements) from a reference provided by a zener diode therein and supplies an error signal through an optoisolator therein to PWM regulator 9. In the preferred embodiment, the single phase output of regulator 9 is a rectangular wave, the duty cycle of which is dependent on the error signal amplitude from circuit 8. Since transistors Q3 and Q4 are complementary, a high output voltage from PWM regulator 9 biases transistor Q3 into conduction, causing base current $I_{b1}$, represented by an inwardly-directed arrow alongside the base of transistor Q1, to turn on PWM transistor Q1. Conversely, a low output voltage from PWM regulator 9 biases transistor Q3 into nonconduction and transistor Q4 into conduction, whereby base current $I_{b2}$, represented by an outwardly-directed arrow, shuts off transistor Q1. In this manner, collector current in PWM power transistor Q1 is pulse width modulated to regulate the average voltage applied to inverter 11.

The emitter of PWM transistor Q1 is connected to the common terminal 15 of the DC input supply through a low value current sense resistor R5. Since the emitter voltage is thus near that of the common terminal of the DC input supply, transistor Q1 can be direct-coupled to low voltage PWM regulator 9. In this arrangement, the pulse width modulated signal for driving transistor Q1 is referenced with respect to the common input DC supply return 15. This is particularly advantageous, since floating inverter 11 rather than PWM transistor Q1 allows a simplified magnetic design for inverter 11 (which is also the case with the linear driven inverter 100 illustrated in FIG. 4). This is due to the fact that in these inverters the PWM duty cycle at the input to the output transformer T does not deviate from 50 percent. The flux, therefore, remains symmetrical in both directions and results essentially in a square wave current through the inverter output transformer. Such transformer currents do not require special design considerations.

For the purpose of direct-coupling the low voltage PWM signal from PWM regulator 9 to the base of transistor Q1, the emitter may be connected directly to the DC input common terminal 15. However, since it is desirable to limit the current through the inverter to a safe level, the emitter to transistor Q1 is instead coupled to the negative side of the input DC source by a current-sense resistor R5. The value of resistor R5 is selected so that the transistor Q1 emitter voltage is less than the characteristic current limiting threshold of the PWM regulator 9 (typically, substantially less than 1 volt). PWM regulator 9, through conductor 13, senses the transistor Q1 emitter voltage and shortens the pulse width of the drive signal to the base of transistor Q1 when the emitter voltage exceeds its characteristic current limiting threshold voltage so that the average voltage applied to inverter 11 and hence the current through it are decreased. In this manner, since the transistor Q1 emitter voltage depends on its emitter current, judicious selection of the value of resistor R5 allows inverter current to be limited to a preselected safe level.

In the preferred embodiment, PWM regulator 9 is a Signetics integrated circuit, known as switched mode power supply control circuit, number NE 556ON. It should also be noted that other switched mode control integrated circuits are commercially available which have driver transistors Q3 and Q4 fabricated on the same chip as the PWM regulator. Since such combined integrated circuits may have a lower power rating than the NE 556ON, their use in the circuit of FIG. 3 is determined by the power required at the base of PWM transistor Q1.

Figure 4:
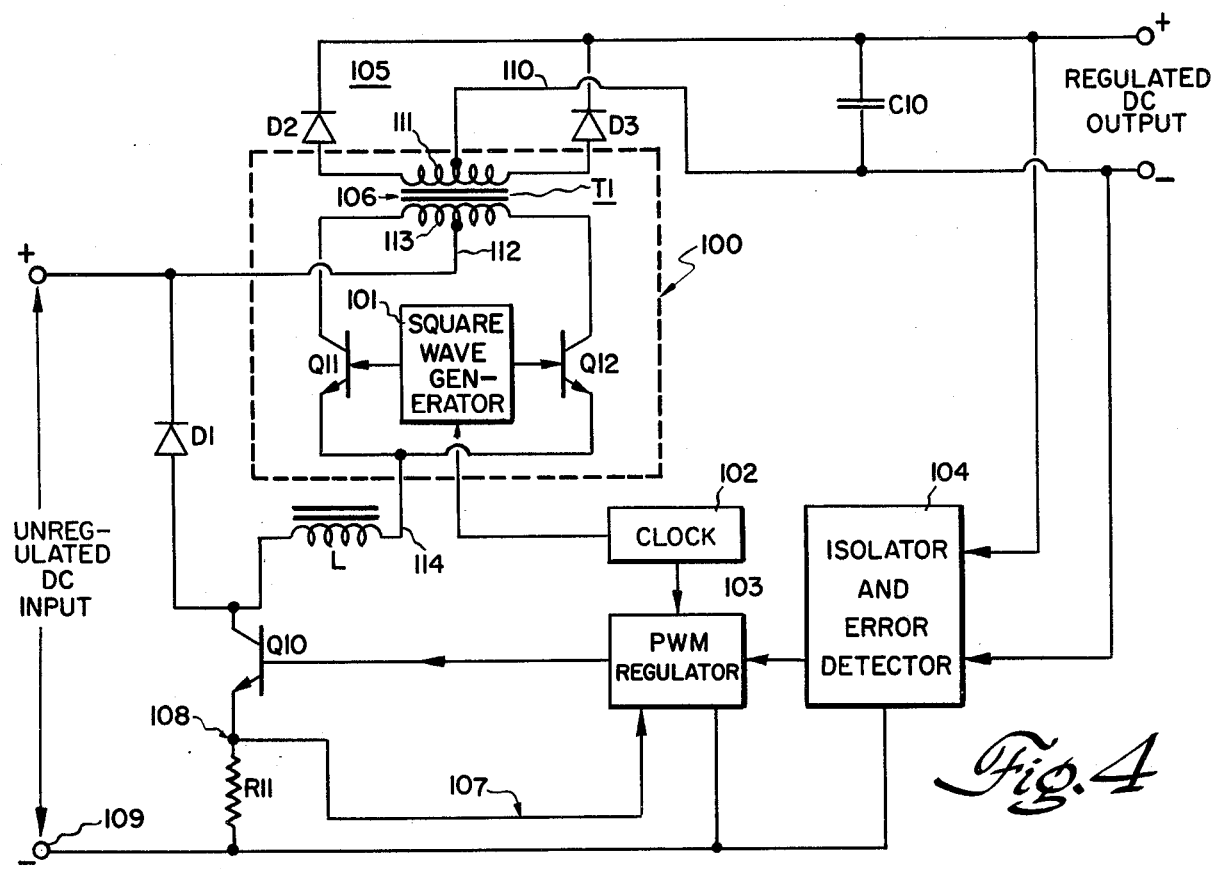
FIG. 4 is a schematic diagram of a linear driven converter including low voltage PWM drive direct-coupled to a PWM transistor.

FIG. 4 illustrates another embodiment of the present invention. In accordance with this embodiment, the current return line 114 of a current sourced linear driven inverter 100 is coupled in series with a PWM transistor Q10 and a constant current source inductor L. Inductor L is connected at one side to the commonly connected emitters of a pair of inverter transistors Q11 and Q12, and at the other to the collector of transistor Q10. A flyback diode D1 couples the collector of transistor Q10 to the positive side of an input DC source. The emitter of transistor Q10 is coupled to the negative side of the DC input source by a current sense resistor R11, establishing a low voltage between the emitter and the negative side of the input DC source and allowing the base of transistor Q10 to be directly driven by a low voltage PWM drive signal from a PWM regulator 103. This, as described earlier, permits a simplified inverter magnetic design.

Inverter 100 comprises a linear output transformer T1, including NPN inverter transistors Q11 and Q12, the respective collectors of which are coupled to the ends of transformer T1 primary winding 113 on core 106 having a center tap 112 connected to the positive side of the input DC source. A square wave generator 101 coupled to the base of each of transistors Q11 and Q12 provides base drive for commutating the transistors. A clock 102 synchronizes the operation of square wave generator 101 and PWM regulator 103. An inverter output circuit 105 comprises a full-wave rectifier made up of diodes D2 and D3 connected to each end, respectively, of an output winding 111 on core 106. A filter capacitor C10 is connected between the cathodes of diodes D2 and D3 at one side and a center tap 110, on output winding 111, at the other.

Control for PWM transistor Q10 is provided by a feedback loop made up of an isolator and error detector 104 (similar to circuit 8 of FIG. 3) coupled at its input to the regulated DC output of inverter output circuit 105 and at its ouput to PWM regulator 103 (similar to PWM regulator 9 of FIG. 3). The feedback loop of the embodiment illustrated in FIG. 4 is identical in its elements and operation to that described in the embodiment of FIG. 3. Inverter current is monitored and maintained below a selected threshold by PWM regulator 103 which is coupled for that purpose to the emitter of PWM transistor Q10 by a voltage-sensing conductor 107.

From the foregoing, it may be appreciated that the current sourced Royer circuit of the present invention provides an improved inverter with reduced current overshoot. With the current overshoot under control, the advantages of the Royer inverter saturating output transformer can be utilized, thereby reducing the size of the transformer required for any given power requirement. Furthermore, inclusion of a rectifier circuit at the output of the Royer inverter results in an improved DC-to-DC converter. It is further seen, that establishing the potential of the PWM power transistor emitter at or near the potential of the common terminal of the DC input supply and isolating the inverter and its output, allows a simplified magnetic design for the Royer inverter as well as for the linear driven inverter.

While this invention has been described with reference to a particular embodiment and examples, other modifications and variations will occur to those skilled in the art in view of the above teachings. Accordingly, it should be understood that the appended claims are intended to cover all such modifications and variations that fall within the true spirit of the invention.

The invention claimed is:

1. A converter for converting an unregulated input voltage from a voltage source having a common terminal, to a regulated output voltage comprising:
   a square wave inverter including an output transformer having primary and secondary windings;
   a constant current source coupled to said inverter and supplying current to said inverter so that a substantially square wave alternating current flows in said primary winding;
   control circuit means for sensing said output voltage and providing a control signal when said output voltage varies by more than a predetermined amount;
   a transistor switch coupled in series with said constant current source, said transistor switch being responsive to said control signal for controlling the voltage on said primary winding so that said output voltage is maintained within predetermined limits, said transistor switch and said constant current source being coupled in the current return line of said inverter; and
   circuit means coupled between the voltage source common terminal and the emitter of said transistor switch for maintaining the emitter voltage of said transistor switch near the voltage on the common terminal of said input voltage source, allowing said control signal to be applied directly to said transistor switch.

2. The converter of claim 1 wherein said control circuit means comprises:
   a voltage error detecting means for providing an error signal when said output voltage departs from a preselected reference voltage; and,
   a regulator circuit coupled between said voltage error detecting means and said transistor switch for providing said control signal having a variable duty cycle to said transistor switch in response to said error signal so as to control conduction of said transistor switch.

3. The converter of claim 2 wherein said control circuit further includes:
   a complementary transistor pair coupled between said regulator and said transistor switch so as to receive said control signal and in response thereto to provide base drive to said transistor switch, whereby said transistor switch conducts for periods determined by the duty cycle of said control signal.

4. The converter of claim 3 including a starter circuit which comprises:
   a source of reference voltage; and
   sensing means coupled to said input voltage source for sensing when said input voltage exceeds the voltage from said source of reference voltage and providing in response thereto start-up power from said input voltage source to said complementary transistors and to said regulator circuit, so that said transistor switch is biased into conduction.

5. The converter of claim 4 further comprising:
   a rectifier circuit coupled to the secondary winding of said transformer for providing a DC voltage to power said complementary transistors and said regulator circuit; and
   means responsive to said DC voltage from said rectifier for biasing said starter circuit into nonconduction.

6. The converter of claim 1, wherein said inverter comprises a Royer circuit.

7. The converter of claim 1 wherein said inverter comprises a linear driven inverter and wherein said control circuit comprises a square wave generator for driving said linear inverter.

8. An inverter for converting a DC input voltage from a DC input voltage source to an output voltage comprising:
   a saturating output transformer having primary and secondary windings;
   a constant current source connected in the current return line of said inverter and powered by said DC input voltage, said constant current source being connected to supply current to said primary winding;
   first and second transistor switch means, each connected in series with said constant current source;
   means for biasing one of said first and second transistor switch means into conduction and biasing the other of said first and second transistor switch means into nonconduction upon saturation of said output transformer, said constant current source being adapted to limit current flow to said inverter circuit upon saturation of said output transformer;
   a feedback control circuit for sensing said output voltage and providing control signals when said output voltage varies by more than a predetermined amount;

third transistor switch means coupled in series with said constant current source for controlling the average voltage applied to said primary winding in response to said control signals from said feedback control circuit.

9. The inverter of claim 8 wherein the DC input voltage source includes a common terminal, said inverter further including means coupled between said common terminal and the emitter of said third transistor switch means for maintaining the voltage on the emitter thereof near the voltage on the common terminal of said DC input voltage source, allowing said control signals to be coupled directly to said third transistor switch means.

10. The inverter of claim 8 wherein said feedback control circuit comprises:
    a voltage error detecting means for providing an error signal when said output voltage departs from a preselected reference voltage; and,
    a PWM regulator circuit coupled between said error detecting means and said third transistor switch means for providing said control signals having a variable duty cycle to said third transistor switch means in response to said error signal so as to control the conduction of said third transistor switch means.

11. The inverter of claim 10 further comprising:
    a complementary transistor pair coupled between said PWM regulator circuit and said third transistor switch so as to receive said control signals and in response thereto to provide base drive to said third transistor switch means whereby said third transistor switch means conducts for periods determined by the duty cycle of said control signals.

12. The inverter of claim 11 including a starter circuit which comprises:
    a source of reference voltage; and
    sensing means coupled to said DC input voltage source for sensing when said DC input voltage exceeds the voltage from said source of reference voltage and providing in response thereto start-up power from said DC input voltage source to said complementary transistors and to said PWM regulator circuit, so that said third transistor switch means is biased into conduction.

13. The inverter of claim 12 further comprising:
    a rectifier circuit coupled to the secondary winding of said transformer for providing a DC voltage to power said complementary transistors and said PWM regulator circuit; and
    means responsive to said DC voltage from said rectifier for biasing said starter circuit into nonconduction.

* * * * *